United States Patent Office 2,928,852
Patented Mar. 15, 1960

2,928,852

6-METHYL-17α,21-DIHYDROXY-4,9(11)-PREGNA-DIENE-3,20-DIONE AND THE 21-ESTERS THEREOF

Frank H. Lincoln, Kalamazoo, William P. Schneider, Kalamazoo Township, Kalamazoo County, and George B. Spero, Kalamazoo, Mich., assignors to The Upjohn Company, Kalamazoo, Mich., a corporation of Michigan No Drawing. Application March 19, 1958
Serial No. 722,381

3 Claims. (Cl. 260—397.45)

The present invention relates to steroids and is more particularly concerned with 6-methyl-17α,21-dihydroxy-4,9(11)-pregnadiene-3,20-dione, the 21-esters thereof and a process for the production thereof.

This application is a continuation-in-part of copending applications Serial No. 624,965, filed November 29, 1956, now abandoned Serial No. 644,214, filed March 6, 1957, and Serial No. 644,200, filed March 6, 1957, now Patent No. 2,867,635.

The process of the present invention comprises: dehydrating a 6-methylhydrocortisone 21-acylate with an acid such as hydrochloric acid, sulfuric acid or with thionyl chloride or preferably with an N-haloamide such as N-bromoacetamide and followed by treatment with anhydrous sulfur dioxide, to obtain the corresponding 6-methyl-17α,21-dihydroxy-4,9(11)-pregnadiene-3,20-dione 21-ester, and hydrolyzing the thus-obtained 6-methyl-17α,21-dihydroxy-4,9(11)-pregnadiene-3,20-dione 21-acylate with a base to produce 17α,21-dihydroxy-4,9(11)-pregnadiene-3,20-dione.

The novel compounds of the present invention, 6-methyl-17α,21-dihydroxy-4,9(11)-pregnadiene-3,20-dione and the 21-esters thereof are active adrenal cortical hormones possessing glucocorticoid and anti-inflammatory activity with a favorable electrolyte balance.

For example, 6α-methyl-17α,21-dihydroxy-4,9(11)-pregnadiene-3,20-dione 21-acetate was found to have a glucocorticoid activity of seventy percent of hydrocortisone and a mineralocorticoid activity of less than two percent of desoxycorticosterone acetate. The novel compound, in addition, was found to be active as an anti-inflammatory agent.

The novel 6-methyl-17α,21-dihydroxy-4,9(11)-pregnadiene-3,20-dione and 21-esters thereof can be prepared and administered to the animal organism in a wide variety of oral, parenteral or topical dosage forms singly, or in admixture with other coacting compounds. They can be associated with a carrier which can be a solid material or a liquid in which the compound is dissolved, dispersed or suspended. The solid compositions can take the form of tablets, powders, capsules, pills or the like, preferably in unit dosage forms for simple administration or precise dosages. The liquid compositions can take the form of solutions, emulsions, suspensions, syrups or elixirs. For example, tablets for advantageous mucosal absorption can be made using either polyethylene glycol 4000 to 6000 as the carrier or lactose and/or sucrose as the diluent. Pharmaceutical compositions and mixtures for topical use can take the form of ointments, lotions, jellies, creams, aqueous suspensions and the like.

The novel compounds of the present invention are also useful as intermediates in the production of other highly active adrenal cortical hormones, 6-methyl-9α-fluorohydrocortisone, 6-methyl-9α-fluorocortisone, the 21-esters thereof and the corresponding 1-dehydro-6-methyl-9α-fluorohydrocortisone and 21-esters thereof. These compounds, and in particular the 6α-epimers thereof, 6α-methyl-9α-fluorohydrocortisone, 6α-methyl-9α-fluorocortisone, 1-dehydro-6α-methyl-9α-fluorohydrocortisone and 21-esters thereof [J. Am. Chem. Soc., 79, 1515 (1957)] possess very high glucocorticoid and anti-inflammatory activity. For example, 1-dehydro-6α-methyl-9α-fluorohydrocortisone was found to have a subcutaneous glucocorticoid activity between 108 and 127 times that of hydrocortisone, while the oral glucocorticoid activity was found to be 191 times that of hydrocortisone.

According to the process disclosed in copending application Serial No. 644,214, filed March 6, 1957, 6-methyl-17α,21-dihydroxy-4,9(11)-pregnadiene-3,20-dione 21-acylate or the free alcohol, i.e., 6-methyl-17α,21-dihydroxy-4,9(11)-pregnadiene-3,20-dione is reacted with a hypohalous acid such as hypochlorous or hypobromous acid, preferably formed in situ, to produce 6-methyl-9α-halo-11β,17α,21-trihydroxy-4-pregnene-3,20-dione 21-acylate or the free alcohol, which on treatment with a mild base such as anhydrous potassium acetate yields the epoxy compound, 6-methyl-9β,11β-oxido-17α,21-dihydroxy-4-pregnene-3,20-dione 21-acylate or, respectively, the unesterified product. Treatment of the epoxy compound with hydrogen fluoride or with hydrogen fluoride releasing agents provides the corresponding 9α-fluoro derivative, 6-methyl-9α-fluoro-11β,17α,21-trihydroxy-4-pregnene-3,20-dione 21-acylate or the free alcohol, 6-methyl-9α-fluorohydrocortisone. Oxidation of the esterified compound, 6-methyl-9α-fluoro-11β,17α,21-trihydroxy-4-pregnene-3,20-dione 21-acylate, with chromic acid provides the 6-methyl-9α-fluoro-17α,21-dihydroxy-4-pregnene-3,11,20-trione 21-acylate, which on hydrolysis with a base provides the free alcohol, 6-methyl-17α,21-dihydroxy-4-pregnene-3,11,20-trione (6-methyl-9α-fluorocortisone). Subjecting 6-methyl-9α-fluorohydrocortisone or the ester thereof to dehydrogenation either by microorganisms such as Septomyxa or with selenium dioxide produces the Δ¹-analogue, 1-dehydro-6-methyl-9α-fluorohydrocortisone or esters thereof.

The starting materials of the present invention are the 6α-methylhydrocortisone ester and 6β-methylhydrocortisone ester as described in Preparations 1 through 6.

In carrying out the process of the present invention, 6-methyl-11β,17α,21-trihydroxy-4-pregnene-3,20-dione 21-acylate (6-methylhydrocortisone 21-acylate) is dehydrated to the corresponding 21-acylate of 6-methyl-17α,21-dihydroxy-4,9(11)-pregnadiene-3,20-dione by methods known in the art, for example, by a dehydrating agent such as phosphorus oxychloride, thionyl chloride, hydrochloric acid or sulfuric acid and acetic acid or by pyrolysis as shown by U.S. Patents 2,640,838 and 2,640,839. In the preferred embodiment of the present invention the dehydration is effected by reacting the 11β-hydroxy compound with a carboxylic acid N-haloamide or N-haloimide in an organic base and treating the thus-produced intermediate 11-hypohalite with dry sulfur dioxide in an organic base. As reagent for the production of an 11-hypohalite, the acid N-haloamide or acid N-haloimide is used wherein the halogen has an atomic number from 17 to 53, inclusive, preferably chlorine or bromine. Examples of such compounds are N-chloroacetamide, N-bromoacetamide, N-chlorosuccinimide, N-bromosuccinimide, N-iodosuccinimide, 3-bromo-5,5-dimethylhydantoin and 1,3-dibromo-5,5-dimethylhydantoin, and the like. Ordinarily an amount in excess of a molar equivalent, calculated on the starting 11β-hydroxy steroid, is employed. The organic base employed as solvent in the production of the 11-hypohalite is a tertiary amine wherein the amino nitrogen is a member of an aromatic ring, for example, the pyridines, that is, pyridine, alkyl-pyridines, picoline, lutidine, collidine, conyrine, parvuline, or the like, or lower fatty amides such as formamide, methylformamide and dimethylformamide. The base is preferably employed in a large molar excess, calculated on the starting 11β-hydroxy steroid, for example, ten molar equivalents per mole of steroid, and is preferably the sole reaction solvent. The reaction to produce an 11-hypohalite is generally conducted under anhydrous conditions, preferably, containing less than 0.1 molar equivalent of water calculated per mole of steroid. Large proportions of water decrease the yield. The temperature of the reaction is between minus forty and plus seventy degrees centigrade, the lower limit being determined by the solubility of the steroid and reagents and the upper limit being determined by the amount of side reaction which normally accompanies the reaction involving any halo compounds at higher temperatures. Ordinarily, room temperature (twenty to thirty degrees centigrade) is preferred for convenience and because of the consistently high yields of the desired product which are obtained at this temperature. A reaction period between five minutes to three hours is usually employed; at higher temperatures—above thirty degrees centigrade—short reaction times are sufficient to effect completion of the reaction.

The thus-produced 6-methyl-11β,17α,21-trihydroxy-4-pregnene-3,20-dione 11β-hypohalite 21-acylate is then treated with anhydrous sulfur dioxide in the presence of or organic base as described hereinbefore. The anhydrous sulfur dioxide can be in the form of gaseous or liquid sulfur dioxide or in the form of a material which in situ produces sulfur dioxide, for example, alkali metal hyposulfite. The reaction temperature ranges substantially within minus forty and plus seventy degrees centigrade and preferably room temperature (twenty to thirty degrees centigrade).

The thus-obtained reaction mixture, containing therein a 6-methyl-17α,21-dihydroxy-4,9(11)-pregnadiene-3,20-dione 21-acylate, is treated with an excess of water, preferably ice water. The aqueous mixture thus obtained is then treated according to conventional means, for example, filtration or extraction, to isolate the crude 6-methyl-17α,21-dihydroxy-4,9(11)-pregnadiene-3,20-dione 21-ester, which is then further purified by conventional means such as recrystallization or chromatography, as deemed necessary.

If the extraction procedure is employed suitable extraction agents which can be used are organic water-immiscible solvents such as ether, chloroform, methylene chloride, carbon tetrachloride, ethyl acetate, benzene, hexanes, or the like. The thus-obtained extracts are conveniently washed, dried and thereupon evaporated to give the desired crude product.

The thus-obtained 6-methyl-17α,21-dihydroxy-4,9(11)-pregnadiene-3,20-dione 21-acylate is hydrolyzed to 6-methyl-17α,21-dihydroxy-4,9(11)-pregnadiene-3,20-dione under conventional conditions for the hydrolysis of cortisone or hydrocortisone 21-acylate, for example in aqueous methanol, sodium or potassium bicarbonate in aqueous methanol, ethanol, or the like, and with the exclusion of oxygen.

The following preparations and examples are illustrative of the process and products of the present invention, but are not to be construed as limiting.

PREPARATION 1

5α,6α-oxido-11β,17α,21-trihydroxyallo-pregnane-3,20-dione 3,20-bis-(ethylene ketal)

To a solution of 0.901 gram of 11β,17α,21-trihydroxy-5-pregnene-3,20-dione 3,20-bis-(ethylene ketal) in eighteen milliliters of chloroform was added a solution of 331 milligrams of perbenzoic acid in 5.19 milliliters of chloroform. The resulting solution was allowed to stand in the refrigerator (ca. four degrees centigrade) for a period of 24 hours and thereupon at room temperature for an additional period of 72 hours. The reaction solution was then washed with five percent sodium bicarbonate solution and water, dried over anhydrous sodium sulfate and evaporated to dryness to give 1.031 grams of crude solid. Recrystallization from acetone gave 431 milligrams of material of melting point 230 to 247 degrees centigrade. The mother liquor, after evaporation to dryness, was dissolved in methylene chloride and chromatographed over 25 grams of acid washed alumina. The column was developed with three fractions each of methylene chloride plus five, ten, fifteen, twenty, 25 and fifty percent acetone, acetone, and acetone plus five percent methanol. The acetone plus five percent methanol eluate gas an additional 279 milligrams of the high melting product. The high melting material, 5α,6α-oxido-11β,17α,21-trihydroxyallopregnane-3,20-dione 3,20-bis-(ethylene ketal) was three times recrystallized from acetone and methanol to give a pure product of melting point 263 to 268 degrees centigrade. Other eluate fractions of lower melting point contained the 5β,6β-isomer thereof.

In the same manner as shown in Preparation 1, other 5α,6α-oxido-11β,17α,21-trihydroxyallopregnane-3,20-dione 3,20-bis-(alkylene ketals) can be prepared by reacting hydrocortison diketals, wherein the ketal group has been formed by reacting the steroid 3,20-dione with ethylene, propylene, 1,2-, 1,3-, or 2,3-butylene glycol or pentane, hexane, heptane, or octane-diols wherein the alcohol groups are in vicinal positions such as 1,2, 2,3, 3,4, or the like, or separated by one carbon atom such as 1,3, 2,4, 3,5, and the like, with an organic peracid such as performic, peracetic, perbenzoic, monoperphthalic acid, or the like. For the purpose of this invention, starting compounds having the ethylene ketal groups are preferred, since these ketals are generally more easily prepared in high yield than ketals produced by the reaction of the 3,20-diketo compounds with higher alkanediols.

PREPARATION 2

5α,11β,17α,21-tetrahydroxy-6β-methylallopregnane-3,20-dione 3,20-bis-(ethylene ketal)

A solution of 1.115 grams of 5α,6α-oxido-11β,17α,21-trihydroxyallopregnane-3,20-dione 3,20-bis-(ethylene ketal) in 165 milliliters of tetrahydrofuran (the tetrahydrofuran being dried through distillation over lithium aluminum hydride) was added dropwise to a solution of 95 milliliters of methyl magnesium bromide in ether (the magnesium bromide having a four molar concentration). To this mixture was added 575 milliliters of benzene and the reaction mixture was thereupon allowed to stir and reflux for 26 hours. After cooling, the reaction mixture was poured into 700 milliliters of iced, saturated ammonium chloride solution, stirred for a period of thirty minutes, and the benzene layer separated from the aqueous layer. The aqueous phase was extracted with three 200-milliliter portions of ethyl acetate and the extracts added to the benzene layer. The combined benzene-ethyl acetate solution was thereupon washed with water, dried over anhydrous sodium sulfate and evaporated to dryness to give 1.314 grams of crude solid. Trituration of this material with ether left 1.064 grams of crystalline product of melting point 221 to 230 degrees. Recrystallization of this material gave 5α,11β,17α,21-tetrahydroxy-6β-methylallopregnane-3,20-dione 3,20-bis-(ethylene ketal) of melting point 228 to 233 degrees and rotation [α]$_D$ minus eleven degrees in chloroform.

Analysis.—Calculated for $C_{26}H_{42}O_8$: C, 64.70; H, 8.77. Found: C, 64.29; H, 8.69.

PREPARATION 3

5α,11β,17α,21-tetrahydroxy-6β-methylallopregnane-3,20-dione

A solution was prepared containing 468 milligrams of 5α,11β,17α,21-tetrahydroxy-6β-methylallopregnane-3,20-dione 3,20-bis-(ethylene ketal), 38 milliliters of methanol and 7.7 milliliters of 2 N sulfuric acid. This solution was refluxed for a period of thirty minutes, then neutralized with five percent dilute sodium bicarbonate solution (about 100 milliliters) and concentrated under reduced pressure at 55 degrees centigrade to about 35 milliliters volume. A product crystallized upon cooling and was recovered by filtration. This product was recrystallized from acetone-Skellysolve B hexanes to give an analytical pure sample of 5α,11β,17α,21-tetrahydroxy-6β-methlyallopregnane-3,20-dione of melting point 240 to 244 degrees (decomposition) and rotation [α]$_D$ plus forty degrees in dioxane.

Analysis.—Calculated for $C_{22}H_{34}O_6$: C, 66.98; H, 8.69. Found: C, 66.84; H, 8.86.

PREPARATION 4

6α-methylhydrocortisone

A stream of nitrogen was bubbled through a solution of 429 milligrams of 5α,11β,17α,21-tetrahydroxy-6β-methylallopregnane-3,20-dione, contained in 100 milliliters of denatured absolute alcohol, for a period of ten minutes. To this solution was added 4.3 milliliters of 0.1 normal sodium hydroxide solution which had likewise been treated with nitrogen. The mixture was allowed to stand in a nitrogen atmosphere for a period of eighteen hours and thereupon was acidified with acetic acid, and concentrated under reduced pressure at 55 degrees centigrade to dryness. The residue weighing 417 milligrams was recrystallized from acetone-Skellysolve B hexanes to give in two crops 249 milligrams of 6α-methylhydrocortisone melting between 184 and 194 degrees centigrade. An analytical sample was prepared melting at 203 to 208 degrees centigrade and consisting of 6α-methylhydrocortisone.

Analysis.—Calculated for $C_{22}H_{32}O_5$: C, 70.18; H, 8.57. Found: C, 70.32; H, 8.50.

The mother liquors contained besides 6α-methylhydrocortisone, substantial amounts of 6β-methylhydrocortisone which can be isolated by recrystallization, papergram, countercurrent procedures and other means known in the art.

PREPARATION 5

6β-methylhydrocortisone

A solution was prepared containing 27.5 grams of 5α,11β,17α,21-tetrahydroxy-6β-methylallopregnane-3,20-dione in 6500 milliliters of ethanol denatured with methanol. The solution was freed of air oxygen by bubbling oxygen-free nitrogen through it for a period of fifteen minutes. To this solution was added a similarly air oxygen-free prepared solution of one-tenth normal sodium hydroxide (235 milliliters). The solution was allowed to stand at room temperature (about 22 to 24 degrees centigrade) in an inert nitrogen atmosphere for a period of twenty hours and was then acidified with fourteen milliliters of acetic acid. The thus-obtained acid solution was evaporated at about fifty to sixty degrees centigrade in vacuo, the thus-produced residue dissolved in 200 milliliters of ethyl acetate and 200 milliliters of water, the water layer separated from the organic layer and discarded, the organic layer washed with 350 milliliters of five percent aqueous sodium bicarbonate solution, then three times with water and thereupon dried over anhydrous sodium sulfate and concentrated to a volume of 180 milliliters. After cooling the 180 milliliters of solution in a refrigerator (about five degrees centigrade), the solution was filtered giving 11.9 grams of material. This material was redissolved in 500 milliliters of ethyl acetate, the ethyl acetate solution was concentrated to 150 milliliters, refrigerated as before to give 6.15 grams of crude 6β-methylhydrocortisone of melting point 220 to 223 degrees centigrade.

Recrystallization of the crude 6β-methylhydrocortisone three more times from ethyl acetate gave an analytical sample of 6β-methylhydrocortisone with melting point 223 to 227 degrees centigrade, rotation [α]$_D$ plus 105 degrees in acetone; ultraviolet absorption $\lambda^{95 \text{ percent ethanol}}_{max.}$ 243 mμ; $a_M$ 14,500.

percent ethanol 243 mμ; $a_M$ 14,500.

Analysis.—Calculated for $C_{22}H_{32}O_5$: C, 70.17; H, 8.57. Found: C, 70.54; H, 8.91.

PREPARATION 6

6α-methylhydrocortisone acetate

A mixture was prepared containing one gram of 6α-methylhydrocortisone in five milliliters of pyridine and five milliliters of acetic anhydride. The mixture was maintained at room temperature (22 to 24 degrees centigrade) for a period of six hours, thereupon poured into 100 milliliters of ice water and the resulting aqueous mixture extracted with three 25-milliliter portions of methylene chloride. The combined methylene chloride solutions were washed, dried over sodium sulfate and evaporated and the thus-obtained residue recrystallized three times from acetone-Skellysolve B hexanes to give pure 6α-methylhydrocortisone 21-acetate (6α-methyl-11β,17α-dihydroxy-21-acetoxy-4-pregnene-3,20-dione) of melting point 213 to 214 degrees centigrade.

Similarly, substituting 6β-methylhydrocortisone in place of 6α-methylhydrocortisone, Preparation 6, above, is productive of 6β-methylhydrocortisone 21-acetate.

In the same manner other 21-acylates can be prepared by esterifying 6α-methylhydrocortisone or 6β-methylhydrocortisone in pyridine solution with the acid halide or acid anhydride of an organic acid, preferably a hydrocarbon carboxylic acid containing from one to twelve carbon atoms, inclusive. Illustrative of the compounds thus produced are 6α-methylhydrocortisone 21-propionate,
6α-methylhydrocortisone 21-butyrate,
6α-methylhydrocortisone 21-valerate,
6α-methylhydrocortisone 21-hexanoate,
6α-methylhydrocortisone 21-trimethylacetate,
6α-methylhydrocortisone 21-isovalerate,
6α-methylhydrocortisone 21-β-cyclopentylpropionate,
6α-methylhydrocortisone 21-benzoate,
6α-methylhydrocortisone 21-β-phenylpropionate,
6α-methylhydrocortisone 21-hemisuccinate,
6α-methylhydrocortisone 21-acrylate,
6α-methylhydrocortisone 21-propiolate,
6α-methylhydrocortisone 21-maleate,
6α-methylhydrocortisone 21-toluenesulfonate,
6β-methylhydrocortisone 21-propionate,
6β-methylhydrocortisone 21-butyrate,
6β-methylhydrocortisone 21-valerate,
6β-methylhydrocortisone 21-laurate,
6β-methylhydrocortisone 21-isobutyrate,
6β-methylhydrocortisone 21-cyclohexane-carboxylate,
6β-methylhydrocortisone 21-phenylacetate,
6β-methylhydrocortisone 21-hemiadipate,
6β-methylhydrocortisone 21-crotonate,
6β-methylhydrocortisone 21-cinnamate,
6β-methylhydrocortisone 21-citraconate,
6β-methylhydrocortisone 21-chloroacetate, and the like.

EXAMPLE 1

6α-methyl-17α,21-dihydroxy-4,9(11)-pregnadiene-3,20-dione 21-acetate

To a solution of 8.5 grams of 6α-methyl-11β,17α,21-trihydroxy-4-pregnene-3,20-dione 21-acetate (6α-methylhydrocortisone 21-acetate) in 42.5 milliliters of pyridine was added 5.63 grams of N-bromoacetamide. After standing at room temperature for a period of fifteen minutes, the reaction solution was cooled to five to ten degrees centigrade and, with shaking, sulfur dioxide gas was passed over the surface until the solution gave no color with acidified starch-iodide paper. During the addition of sulfur dioxide gas, the reaction became warm.

The temperature was kept under thirty degrees centigrade by external cooling and by varying the rate of sulfur dioxide addition. Thereafter to the reaction mixture 400 milliliters of ice water was added and the resulting precipitate collected by filtration. This material was recrystallized from acetone-Skellysolve B hexanes to give 5.78 grams of 6α-methyl-17α,21-dihydroxy-4,9(11)-pregnadiene-3,20-dione 21-acetate of melting point 165 to 169 degrees centigrade. The mother liquors were evaporated to a partly crystalline residue which weighed 1.82 grams. This material was dissolved in methylene chloride and chromatographed on 75 grams of Florisil. The column was eluted with 2000 milliliters of eight percent acetone-92 percent Skellysolve B and 1000 milliliters of fifteen percent acetone-85 percent Skellysolve B. The eluant was collected in 200-milliliter fractions. Fractions 3 to 7 were combined, evaporated, and the residue recrystallized from acetone-Skellysolve B hexanes to yield 0.88 gram of 6α-methyl-17α,21-dihydroxy-4,9(11)-pregnadiene-3,20-dione 21-acetate of melting point 169 to 172 degrees centigrade. The combined yield therefore was 6.66 grams or 82.4 precent. An analytical sample obtained by crystallization from acetone-Skellysolve B hexanes gave 6α-methyl-17α,21-dihydroxy-4,9(11)-pregnadiene-3,20-dione 21-acetate having a melting point of 175 to 176 degrees centigrade, a rotation $[\alpha]_D$ of plus 91 degrees in chloroform and an ultraviolet absorption $\lambda_{max}^{alc.}$ 239.5, $a_M$ 16,400

*Analysis.*—Calculated for $C_{24}H_{32}O_5$: C, 71.94; H, 8.05. Found: C, 71.75; H, 7.71.

Similarly, substituting 6β-methyl-11β,17α,21-trihydroxy-4-pregnene-3,20-dione 21-acetate (6β-methylhydrocortisone 21-acetate) in place of 6α-methyl-11β,17α,21-trihydroxy-4-pregnene-3,20-dione (6α-methylhydrocortisone 21-acetate) Example 1 is productive of 6β-methyl-17α,21-dihydroxy-4,9(11)-pregnadiene-3,20-dione 21-acetate.

In the same manner other 6-methyl-17α,21-dihydroxy-4,9(11)-pregnadiene-3,20-dione 21-acylates are prepared by substituting as starting material in Example 1 the selected 6-methylhydrocortisone 21-acylate in place of 6β-methylhydrocortisone 21-acetate.

Illustrative of the compounds thus produced are

6α-methyl-17α,21-dihydroxy-4,9(11)-pregnadiene - 3,20-dione 21-propionate,
6α-methyl-17α,21-dihydroxy-4,9(11)-pregnadiene - 3,20-dione 21-butyrate,
6α-methyl-17α,21-dihydroxy-4,9(11)-pregnadiene - 3,20-dione 21-valerate,
6α-methyl-17α,21-dihydroxy-4,9(11)-pregnadiene - 3,20-dione 21-hexanoate,
6α-methyl-17α,21-dihydroxy-4,9(11)-pregnadiene - 3,20-dione 21-trimethylacetate,
6α-methyl-17α,21-dihydroxy-4,9(11)-pregnadiene - 3,20-dione 21-isovalerate,
6α-methyl-17α,21-dihydroxy-49(11)-pregnadiene - 3,20-dione 21-β-cyclopentylpropionate,
6α-methyl-17α,21-dihydroxy-4,9(11)-pregnadiene - 3,20-dione 21-benzoate,
6α-methyl-17α,21dihydroxy-4,9(11)-pregnadiene - 3,20-dione 21-β-phenylpropionate,
6α-methyl-17α,21-dihydroxy-4,9(11)-pregnadiene - 3,20-dione 21-hemisuccinate,
6α-methyl-17α,21-dihydroxy-4,9(11)-pregnadiene - 3,20-dione 21-acrylate,
6α-methyl-17α,21-dihydroxy-4,9(11)-prednadiene - 3,20-dione 21-propiolate,
6α-methyl-17α,21-dihydroxy-4,9(11)-pregnadiene - 3,20-dione 21-maleate,
6α-methyl-17α,21-dihydroxy-4,9(11)-pregnadiene - 3,20-dione 21-toluenesulfonate,
6β-methyl-17α,21-dihydroxy-4,9(11)-pregnadiene - 3,20-dione 21-propionate,
6β-methyl-17α,21-dihydroxy-4,9(11)-pregnadiene - 3,20-dione 21-butyrate,
6α-methyl-17α,21-dihydroxy-4,9(11)-pregnadiene - 3,20-dione 21-valerate,
6β-methyl-17α,21-dihydroxy-4,9(11)-pregnadiene - 3,20-dione 21-laurate,
6β-methyl-17α,21-dihydroxy-4,9(11)-pregnadiene - 3,20-dione 21-isobutyrate,
6β-methyl-17α,21-dihydroxy-4,9(11)-pregnadiene - 3,20-dione 21-cyclohexane-carboxylate,
6β-methyl-17α,21-dihydroxy-4,9(11)-pregnadiene - 3,20-dione 21-phenylacetate,
6β-methyl-17α,21-dihydroxy-4,9(11)-pregnadiene - 3,20-dione 21-hemiadipate,
6β-methyl-17α,21-dihydroxy-4,9(11)-pregnadiene - 3,20-dione, 21-crotonate,
6β-methyl-17α,21-dihydroxy-4,9(11)-pregnadiene - 3,20-dione 21-cinnamate,
6β-methyl-17α,21-dihydroxy-4,9(11)-pregnadiene - 3,20-dione 21-citraconate,
6β-methyl-17α,21-dihydroxy-4,9(11)-pregnadiene - 3,20-dione 21-chloroacetate, and the like.

Example 2

*6α-methyl-17α,21-dihydroxy-4,9(11)-pregnadiene-3,20-dione*

One gram of 6α-methyl-17α,21-dihydroxy-4,9(11)-pregnadiene-3,20-dione 21-acetate is dissolved in 100 milliliters of methanol, previously purged of air-oxygen by passing nitrogen through it for ten minutes, and thereto is added 0.5 gram of potassium bicarbonate in ten milliliters of water similarly purged of oxygen. The mixture is allowed to stand at room temperature in a nitrogen atmosphere for five to eight hours, thereupon neutralized with 0.66 milliliter of acetic acid in fifteen milliliters of water, and concentrated at reduced pressure and below sixty degrees centigrade until precipitation begins. Thereupon 100 milliliters of water is added and the mixture is chilled. The precipitate of crude 6α-methyl-17α,21-dihydroxy-4,9(11)-pregnadiene-3,20-dione is separated by filtration, washed with water, and dried. It can be purified by conventional means such as crystallization from methanol, acetone, ethyl acetate and the like, or chromatography over synthetic magnesium silicate.

Similarly, substituting as starting material 6β-methyl-17α,21-dihydroxy-4,9(11) - pregnadiene - 3,20 - dione 21-acetate in place of 6α-methyl-17α,21-dihydroxy-4,9(11)-pregnadiene-3,20-dione 21-acetate, Example 2, above, is productive of 6β - methyl - 17α,21 - dihydroxy - 4,9(11)-pregnadiene-3,20-dione.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 6α-methyl-17α,21-dihydroxy-4,9(11)-pregnadiene-3,20-dione of the formula:

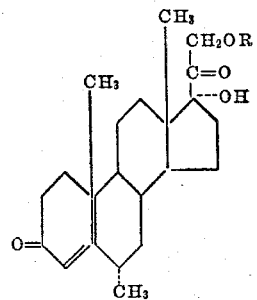

wherein R is selected from the group consisting of hydrogen and the acyl radical of a hydrocarbon carboxylic acid containing from one to twelve carbon atoms, inclusive.

2. 6α-methyl-17α,21-dihydroxy - 4,9(11) - pregnadiene-3,20-dione.

3. 6α-methyl-17α,21-dihydroxy - 4,9(11) - pregnadiene-3,20-dione 21-acetate.

References Cited in the file of this patent

UNITED STATES PATENTS

| | | |
|---|---|---|
| 2,640,838 | Wendler et al. | June 2, 1953 |
| 2,707,190 | Farrar | Apr. 26, 1955 |

UNITED STATES PATENT OFFICE
Certificate of Correction

Patent No. 2,928,852                                                               March 15, 1960

Frank H. Lincoln et al.

It is hereby certified that error appears in the printed specification of the above numbered patent requiring correction and that the said Letters Patent should read as corrected below.

Column 8, line 3, for "6α-methyl" read —6β-methyl—; lines 62 to 73, the formula should appear as shown below instead of as in the patent:

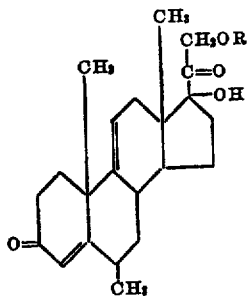

Signed and sealed this 30th day of August 1960.

[SEAL]

Attest:
ERNEST W. SWIDER,
*Attesting Officer.*

ROBERT C. WATSON,
*Commissioner of Patents.*